Feb. 28, 1956     C. F. KAUNITZ     2,736,347
ELECTRIC WELDING MACHINE
Filed Oct. 8, 1954     3 Sheets-Sheet 2
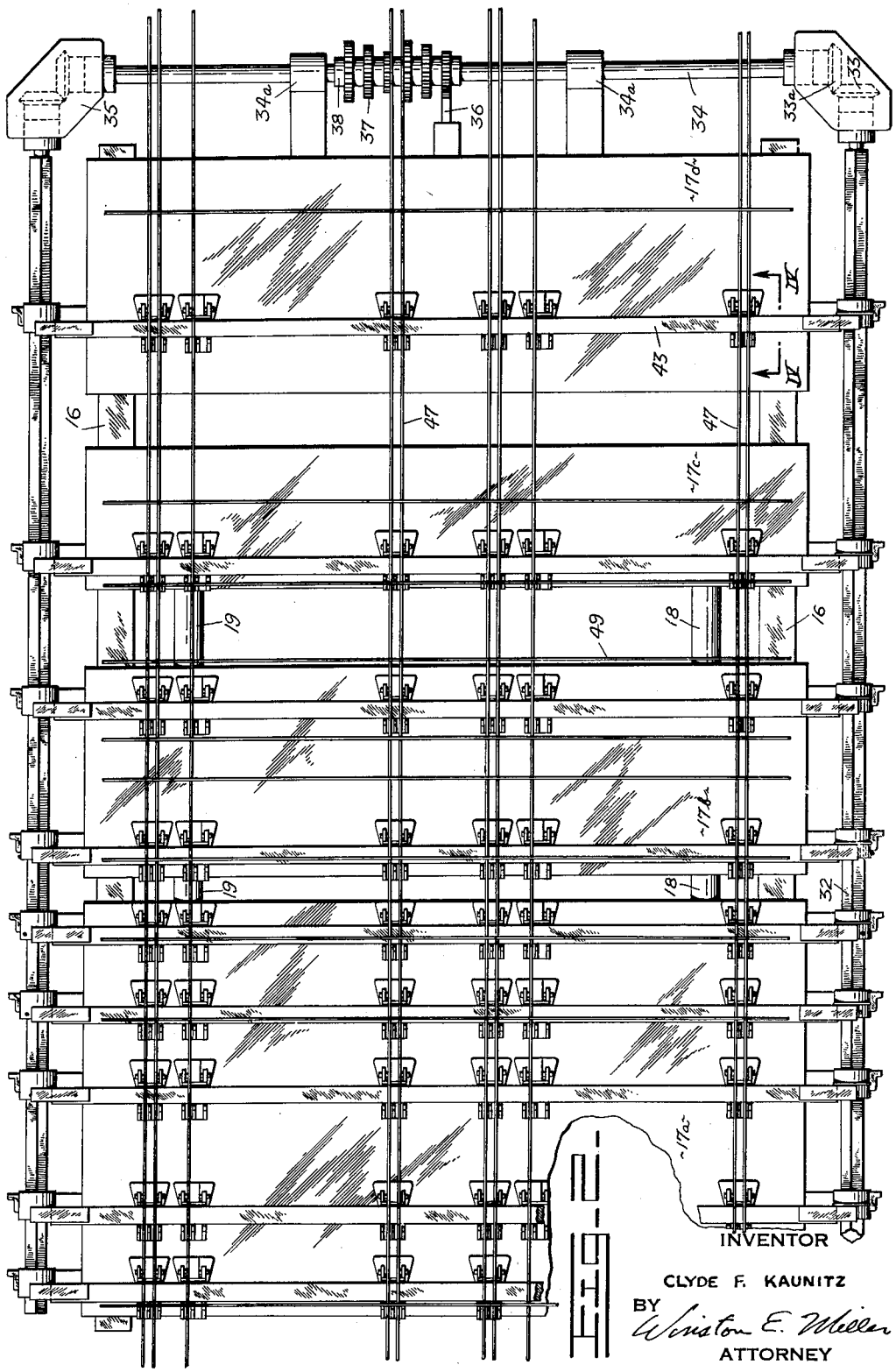
INVENTOR
CLYDE F. KAUNITZ
BY
ATTORNEY

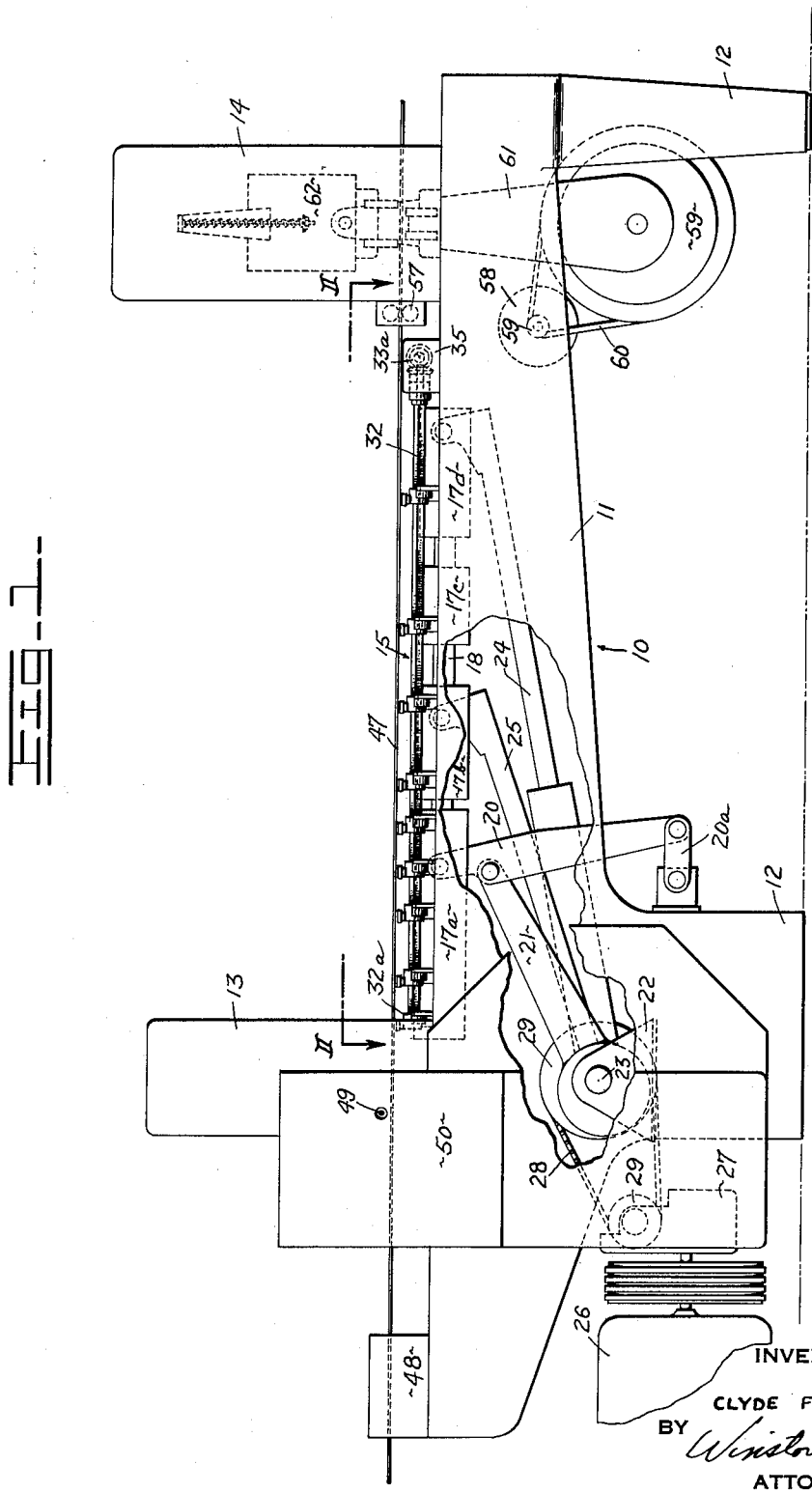

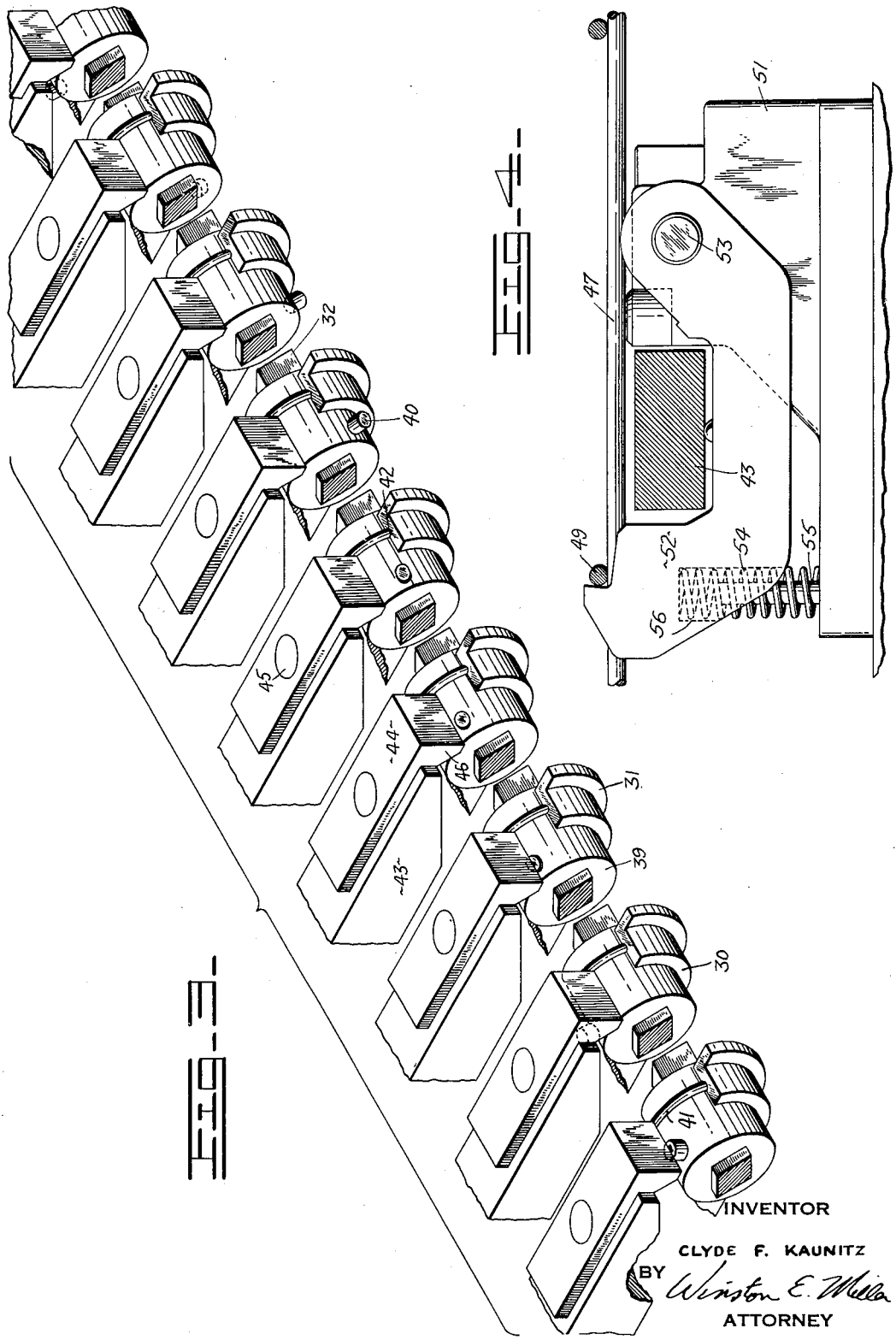

United States Patent Office 2,736,347
Patented Feb. 28, 1956

2,736,347

ELECTRIC WELDING MACHINE

Clyde F. Kaunitz, Bay City, Mich.

Application October 8, 1954, Serial No. 461,199

3 Claims. (Cl. 140—112)

This invention relates generally to an improved electric welding machine for welding wire mats and the like for use in vehicle seats, and more particularly, it relates to means whereby identical wire mats may be produced in large quantities.

Heretofore, and as well recognized by those skilled in the art, industry has been faced with the problem of producing quantity mats, and specifically mats having wires welded therein that are evenly spaced apart according to a predetermined pattern, and so related that each wire grouping or mat is within the realm of possibility an exact duplicate of every other mat. This basic requirement of exact duplication in the manufacture of mats and the like has in the past been accomplished only by frequent work stoppage, checking, and resetting of the mechanism which determines and controls the spacing of wires in any given mat prior to the welding operation. Essentially, the problem has been that of avoiding the accumulation of errors in the distance between, for example, the first cross wire and the sixth or seventh cross wire in any given mat. In the event that a measurement error appeared between any cross wire, that error would be carried, with the consequence of error between all subsequent cross wires in any given mat.

With this problem in mind and with the intent of solving same, and likewise providing a welding machine capable of manufacturing like mats in great quantities, it is therefore one of the principal objects of the present invention to provide means whereby each cross wire is individually moved a predetermined distance and the accumulation of errors in the distance between any cross wire is prevented.

It is also an object of the invention to provide means for creating a multitude of varying shaped mats or the like, and mats whose cross spacing may be determined by individual actuating means.

Another object of the invention is to provide rapid means for welding cross wires and long wires, moving said wires in a longitudinal plane, and cutting-off wire mats at preselected lengths in accordance with any desired pattern.

In meeting the above objects and purposes, as well as others incidental thereto and associated therewith, I have provided a machine of the class described comprising a frame having stanchion members at opposing ends thereof, a pair of spaced-apart ways in longitudinal alignment with the sides of said frame, a group of platens adapted to ride on said ways, some of said platens being firmly connected for group movement, independent platens riding on said ways disconnected from said group of platens, a first lever engaging said machine and said group of platens, a second lever engaging one independent platen, a third lever engaging a second independent platen, a shaft supported in pillow blocks mounted on said machine for carrying in off-center engagement the lower ends of all of said levers, driving means in attachment with said shaft for reciprocatingly moving said levers and all of said platens in timed relationship and coordination with said off-center engagement, a pair of spaced-apart second shafts engaging said machine at one end and having bevel gears attached thereto at the opposite end, a third shaft in transverse alignment with one end of said machine having second bevel gears at opposing ends thereof in meshed engagement with said bevel gears, an actuator attached to said second independent platen, a group of ratchet gears in mounted relationship to said third shaft, a plurality of spools in spaced-apart relationship mounted on each of said second shafts, each of said spools having angularly disposed studs thereon in angular coincidence with the facing on one of said group of ratchet gears, a plurality of cradles for carrying each of said spools, and a plurality of transversely disposed rack bars between oppositely disposed spools, actuating members attached to each of said platens in operative alignment with each of said rack bars, each actuating member comprising a finger in pivotal attachment thereto, resilient spring means for enabling the upward movement of said finger, and means whereby upon actuation of said rack bars some of said fingers and said actuating members move in accordance with the movement of said related platen and in such relationship thereto as to reflect the angular displacement of each related spool.

For illustration of a preferred embodiment of the invention, attention is directed to the accompanying drawings in which:

Figure 1 is a side elevational view of the electric welding machine showing the platen actuating means and the mechanism for controlling the operation of the rack bars and actuating members;

Figure 2 is a top plan view of the machine, taken on line II—II of Figure 1;

Figure 3 is a detail perspective view of the mechanism for controlling the operation of the rack bars and actuating members; and Figure 4 is a side elevational view of one actuating member that moves the cross wire of the mat in a predetermined amount, and is taken on line IV—IV of Figure 2.

In describing the present invention I have found it expedient not to disclose certain portions of the welding machine structure that are well known, but in view of the fact that the present invention is directed in part to the welding machine structure, a brief description and explanation of said portions will be necessary for a clear understanding of the present invention. Therefore, I shall not enter into a detailed description of all of the elements of the machine structure except as such structure may enter into combination with other elements as contemplated by the present invention.

Considering now the drawings in more detail and referring first to Figure 1, the numeral 10 denotes generally the electric welding machine having a frame 11 and supports 12 for mounting the machine. A series of welding electrodes are laterally disposed between the inner walls of the stanchion 13 and are conventional in use and disposition. The stanchion 14 provides supporting means for a cutting shear that operates in timed relationship with a predetermined setting for severing accumulated wires into identical mat lengths.

Interposed near the frame 11 and longitudinally in the machine bed, indicated generally by the numeral 15, are ways 16 that serve as tracks for the platens 17a, 17b, 17c, and 17d. The platens 17a and 17c are fastened together by the rods 18 and 19, whereby longitudinal reciprocating movement imparted to one of said platens causes like movement in the remaining platen. The platens 17b and 17d are not secured to any of the aforementioned platens and operate independently with relation thereto.

Reciprocating longitudinal movement of the platens 17a and 17c is controlled by the arm 20 in movable engagement with the platen 17a and the arm 20a. Said arm 20 is further pivotally attached to the lever 21, which at its lower end is in off-center connection with the shaft 23 that rides in the pillow blocks 22, whereby upon actuation of said shaft 23 the lever 21 and the arm 20 cause the platen 17a and the attached platen 17c to move in conjunction therewith. The lever 24 likewise engages the platen 17d and further engages the shaft 23 in off-center attachment at the lower end of said lever, whereby upon actuation of said shaft 23 the lever 24 reciprocatingly moves the platen 17d in accordance with a preset pattern as determined by the attachment of the lever to said shaft 23. Further, the lever 25 also engages the shaft 23 and is adapted to control the movement of the platen 17b.

The operation above is accomplished by means of the motor 26 in linked engagement with the shaft 23 through the drive reduction mechanism 27, the chain 28, and the pulleys 29.

Referring now to Figure 3, I have provided cradles 30 having flanges 31 thereon, said cradles being fastened at spaced longitudinal intervals along the bed 15 of the machine. The shafts 32 are longitudinally disposed in the bed 15 and are rotatably mounted in bushings 32a at one end and engage the bevel gears 33 at the opposing end. Said bevel gears 33 are adapted to engage the bevel gears 33a in pressed relationship with the opposing ends of the transversely positioned shaft 34, mounted in position by the supports 34a. The bevel gears 33 and 33a are suitably enclosed in gear boxes 35 which are attached to the frame 11 of the machine. Adjustably mounted on the platen 17d is an actuator 36 for cooperatively and selectively engaging any of the ratchet gears 37 that are of varying sizes and tooth shape facing and fastened to the sleeves 38 on said shaft 34, whereby upon cooperative action between said actuator 36 and any of said ratchet gears 37 a determinable rotation may be imparted to the shafts 34 and 32. Spools 39 are fastened at varying intervals to the shafts 32 and are secured in position by the studs 40, whereby upon rotation of said shafts 32 each of said spools 39 ride in a mating cradle 30. Each of said spools 39 is provided about its circumference with a flange 41 that is adapted to rotate in the guides 42, so as to guide the movement of said spools in their respective cradles 30.

The rack bars 43 extend transversely across the bed 15 of the machine and are fastened at the ends thereof to the latching bars 44 by the recessed bolts 45. The latching bars 44 have a head portion 46, the underside of which rides on the surface of the spools 39 and in conjunction with the rack bars 43 are raised accordingly on contact with the studs 40 of said spools 39.

The long wires 47 are fed from individual spools, not shown, through a wire straightening apparatus 48 at one end of the machine 10, between the laterally disposed welding electrodes, not shown, in the stanchion 13, and onto and across the rack bars 43. Cross wire 49 is likewise fed from a spool, not shown, into a feeding mechanism 50, severed at a predetermined length, and moved laterally across the machine bed 15 and over the long wires 47. The length of each cross wire having been predetermined and on accomplishment of the welding operation, the long wires 47 and the cross wires 49 resemble a mat pattern as indicated in Figure 2.

Fastened to the upper side of each of said platens 17a, 17b, 17c, and 17d and in longitudinal alignment with the frame 11 of the machine are the actuating members 51. Each of these members 51 includes the finger 52 which is pivotally connected to the bolt 53 on each of said members 51. The members 51 are disposed on each of said platens at right angle to each of the rack bars 43 and are adapted to seat the rack bars 43 and follow the movements thereof. A resilient spring 54 is supported by the bolt 55 and is adapted to fit a recess 56 in the underside of each of said fingers 52, whereby to push the finger 52 upwardly on raising movement of any rack bar 43.

Operation

In the following description of the operation of the machine, reference first will be made to the mechanical portions thereof, and thence the description will proceed through the cycle required in the manufacture of any given mat.

In operating the machine, the lower ends of the levers 21, 24, and 25 are disposed in relationship to the shaft 23 so as to cause a predetermined reciprocating stroke of said levers and the consequential movement of the platens 17a, 17b, 17c, and 17d. The actuating members 51 are likewise positioned on the respective platens and with such relationship to the rack bars 43 so as to cause a further predetermined movement with respect to selected ratchet gears 37 that are fastened to the sleeves 38 on the shaft 34.

Inasmuch as the spools 39 can be variably disposed on each of the shafts 32 at a variety of angular dispacements and likewise disposed on said shafts at variable positions with respect to each other, it is incumbent upon the operator to align the engagement of such ratchet gear 37 that directly reflects the pattern or configuration of a desired mat. Assuming that such desired mat pattern resembles the mat indicated in Figure 2, the operator would select the ratchet gear 37 as described, or one whose engagement with the actuator 36 would cause the shafts 34 and 32 and the spools 39 to turn through a proper number of degrees. Each of the studs 40 on the spools 39, in accordance thereof, would be preset at such angular position so as to directly reflect the angular movement of the engaged ratchet gear 37, whereby upon movement thereof the engaging stud 40 would relate to the adjacent latching bar 44 and cause said bar to lift upwardly. Upon such upward movement the finger 52 of the actuating member 51 would be lifted by the spring 54 whereby to engage a cross wire 49. In timed sequence the cross wire 49 would be moved a set longitudinal distance as determined by the length of stroke of the appropriate levers 21, 24, and 25 in engagement with the platens 17a, 17b, 17c, and 17d.

As each finger 52 is raised sufficiently to engage a cross wire 49, the platen in attachment therewith moves in a longitudinal path and thereby moves the wire mat by pulling a single cross wire the same distance as that covered by the said platen. On the return stroke of the applicable levers 21, 24, and 25 and the appropriate platen, the head portion 46 of the rack bar 43 moves beyond the stud 40 and causes said rack bar 43 to drop on the finger 52 and compress the spring 54.

On completion of the above stroke the ratchet gear 37 appropriately moves a second spool, and the stud 40 raises the adjoining rack bar 43 and enables by the forward stroke of the applicable platen the engaging of the corresponding cross wire 49, which likewise moves an appropriate longitudinal distance. On the completion of the return stroke, the third spool is engaged, and so on, to complete a full cycle, before commencing to repeat same.

As will be recognized by those skilled in the art, each cross wire is independently moved a predetermined distance, and this independent actuation essentially constitutes the inventive concept as disclosed. It will likewise be appreciated that the welding of long wires and cross wires constitutes part of the cycle of cross wire movement, whereby upon the termination of any given platen movement, the electrodes weld the priorly introduced long wires and cross wires at their intersections thereof.

The said wire mats then move through the rollers 57 and into the stanchion 14 preparatory to shearing.

By means of the motor 58 which moves the pulleys 59 by means of the belt 60, the shear actuating means 61 causes the shear 62 to sever the long wires into a predetermined mat length.

Inasmuch as the actuating members 51 may be fastened to the appropriate platens 17a, 17b, 17c, and 17d in differing positions, and since any ratchet gear 37 and the angular positioning of the studs 40 may be likewise corresponded, and moreover since the longitudinal movement of any of said platens may be adapted to fit the sequence of movements aforesaid, it will be appreciated that a variety of wire mat patterns can be created. And since each cross wire 49 is independently moved, it is therefore possible to create identical wire mats, in that the accumulation of errors between cross wires is eliminated.

The foregoing statements regarding the functioning of the machine have been substantiated by actual work in the field. Machines constructed in accordance with the teachings of my invention have been subjected to severe actual working conditions in the shop and have materially increased the quantity and quality of wire mats.

Obviously numerous changes and modifications may be made in certain of the structural features described above without departing from the spirit and scope of my invention, said invention being limited only by the scope of the appended claims.

Having thus described my invention, what I claim as new and desire to secure by Letters Patent is:

1. A machine of the class described comprising a frame having stanchion members at opposing ends thereof, a pair of spaced-apart ways in longitudinal alignment with the sides of said frame, a group of platens adapted to ride on said ways, some of said platens being firmly connected for group movement, independent platens riding on said ways disconnected from said group of platens, a first lever engaging said machine and said group of platens, a second lever engaging one independent platen, a third lever engaging a second independent platen, a shaft supported in pillow blocks mounted on said machine for carrying in off-center engagement the lower ends of all of said levers, driving means in attachment with said shaft for reciprocatingly moving said levers and all of said platens in timed relationship and coordination with said off-center engagement, a pair of spaced-apart second shafts engaging said machine at one end having bevel gears attached thereto at the opposite end, a third shaft in transverse alignment with one end of said machine having second bevel gears at opposing ends thereof in meshed engagement with said bevel gears, an actuator attached to said second independent platen, a group of ratchet gears in mounted relationship to said third shaft, a plurality of spools in spaced-apart relationship mounted on each of said second shafts, each of said spools having angularly disposed studs thereon in angular coincidence with the facing on one of said groups of ratchet gears, a plurality of cradles for carrying each of said spools, and a plurality of transversely disposed rack bars between oppositely disposed spools, actuating members attached to each of said platens in operative alignment with each of said rack bars, each actuating member comprising a finger in pivotal attachment thereto, resilient spring means for enabling the upward movement of said finger, and means whereby upon actuation of said rack bars some of said fingers and said actuating members move in accordance with the movement of said related platen and in such relationship thereto as to reflect the angular displacement of each related spool.

2. In a machine for welding wires into a determinable pattern and individually moving some of said wires, the combination of, a frame, a group of platens adapted for differing reciprocating longitudinal movement in said frame, and means for effectuating said movement, a pair of first shafts each in spaced relationship to the inner side of said frame and engaging said frame at one end thereof, a second shaft in transverse alignment with said frame in geared relationship with each of said first shafts, a plurality of ratchet gears intermediate the ends of said second shaft, an actuator on one of said platens for engaging one of said ratchet gears, spools in variable positions on said first shafts, each of said spools having a stud thereon at angular displacement coinciding with the angular displacement of facing on one of said ratchet gears, a plurality of mating cradles for supporting said spools, several rack bars transversely positioned across said group of platens and adapted for actuation by said group of platens, actuating members fastened to said platens and carrying said rack bars, means whereby on intermittent rotary movement of one of said ratchet gears the related rack bar raises, and one of said group of platens reciprocatingly moves the related actuating members, thereby intermittently moving some of said wires in accordance with any preset pattern as determined by the angular positioning of the studs on said spools with relation to each other.

3. In a machine for welding wires into a determinable pattern and individually moving some of said wires, the combination of, a frame, a group of platens adapted for differing reciprocating longitudinal movement in said frame, and means for effectuating said movement, a pair of first shafts each in spaced relationship to the inner side of said frame and engaging said frame at one end thereof, a second shaft in transverse alignment with said frame in geared relationship with each of said first shafts, a plurality of ratchet gears intermediate the ends of said second shaft, an actuator on one of said platens for engaging one of said ratchet gears, spools in variable positions on said first shafts, each of said spools having a stud thereon at angular displacement coinciding with the angular displacement of facing on one of said ratchet gears, a flange about the circumference of each of said spools, mating cradles for supporting each of said spools, each cradle having a mating guide therein adapted to fit said flange for preventing side movement of said spool in a mating cradle, several rack bars transversely positioned across said group of platens and adapted for actuation by said spool studs, actuating members fastened to said platens and carying said rack bars, means whereby on intermittent rotary movement of one of said ratchet gears the related rack bar raises, and one of said group of platens moves the related actuating members, thereby intermittently moving some of said wires in accordance with any preset pattern as determined by the angular positioning of the studs on said spools with relation to each other and to the facing on a selected ratchet gear.

References Cited in the file of this patent

UNITED STATES PATENTS

| Number | Name | Date |
|---|---|---|
| 1,915,184 | Cosgrove | June 20, 1933 |
| 1,923,369 | Gronemeyer et al. | Aug. 22, 1933 |
| 1,937,078 | Wickwire | Nov. 28, 1933 |